(12) United States Patent
Tanaka et al.

(10) Patent No.: US 9,225,421 B2
(45) Date of Patent: Dec. 29, 2015

(54) OFDMA OVERLAY ON LEGACY PASSIVE OPTICAL NETWORKS USING OPTICAL NYQUIST FILTERING

(71) Applicant: NEC Laboratories America, Inc., Princeton, NJ (US)

(72) Inventors: Akihiro Tanaka, Kawasaki (JP); Neda Cvijetic, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/303,873

(22) Filed: Jun. 13, 2014

(65) Prior Publication Data

US 2014/0369691 A1 Dec. 18, 2014

Related U.S. Application Data

(60) Provisional application No. 61/834,627, filed on Jun. 13, 2013.

(51) Int. Cl.
*H04J 14/02* (2006.01)
*H04B 10/2507* (2013.01)
*H04B 10/516* (2013.01)
*H04B 10/54* (2013.01)
*H04B 10/548* (2013.01)

(52) U.S. Cl.
CPC ...... *H04B 10/25073* (2013.01); *H04B 10/5161* (2013.01); *H04B 10/541* (2013.01); *H04B 10/548* (2013.01); *H04J 14/02* (2013.01)

(58) Field of Classification Search
CPC . H04B 10/25073; H04J 14/02; H04J 14/0246

USPC .......... 398/183, 66, 67, 8, 69, 70, 71, 89, 68, 398/75, 76, 100, 72, 201
See application file for complete search history.

(56) References Cited

U.S. PATENT DOCUMENTS

| | | | | |
|---|---|---|---|---|
| 2008/0267630 A1* | 10/2008 | Qian et al. | | 398/89 |
| 2010/0054740 A1* | 3/2010 | Lee et al. | | 398/68 |
| 2012/0057883 A1* | 3/2012 | Andre et al. | | 398/208 |
| 2014/0241717 A1* | 8/2014 | Cvijetic et al. | | 398/48 |
| 2014/0294393 A1* | 10/2014 | Lowery et al. | | 398/76 |

OTHER PUBLICATIONS

Cvijetic, N., et al. "Dynamic Wavelength Virtualization and/or On-Demand Flow Provisioning in Optical Networks" U.S. Appl. No. 14/184,787, filed Feb. 20, 2014. (35 Pages).
Cvijetic, N., et al. "First OpenFlow-based Software-Defined λ-Flow Architecture for Flex-Grid OFDMA Mobile Backhaul over Passive Optical Networks with Filterless Direct Detection ONUs" OFC/NFOEC Postdeadline Papers. Optical Society of America. 2013. pp. 1-3.

* cited by examiner

*Primary Examiner* — Hanh Phan
(74) *Attorney, Agent, or Firm* — Joseph Kolodka

(57) ABSTRACT

Methods and systems for combining signals include modulating data onto a first signal at a first frequency and wavelength; modulating data onto a second signal at a second wavelength using a modulation scheme that produces spectral components at the first frequency; filtering the second signal using an optical filter to suppress spectral components that would cause interference to the first signal; and combining the first signal and the second signal onto a transmission medium.

8 Claims, 5 Drawing Sheets

OFDMA OVERLAY ON LEGACY PASSIVE OPTICAL NETWORKS USING OPTICAL NYQUIST FILTERING

RELATED APPLICATION INFORMATION

This application claims priority to provisional application Ser. No. 61/834,627 filed on Jun. 13, 2013, incorporated herein by reference.

BACKGROUND

1. Technical Field

The present invention relates to optical networks and, more particularly, to using legacy passive optical networks to carry orthogonal frequency division multiple access (OFDMA) signals and filtered legacy on-off keying (OOK) signals to limit interference between the OOK signals and the OFDMA signals.

2. Description of the Related Art

Passive optical networks (PONs) have been widely used in optical access networks to provide data signals. Legacy PONs use on-off keying (OOK) to transmit data along fiber optic cables. However, this existing infrastructure may also be used for mobile backhaul communications, providing access to the core network to mobile access points (e.g., cell towers) using orthogonal frequency division multiple access (OFDMA) signals. To reduce cost, it is desirable that remote-site optical receivers in these systems be colorless (i.e. wavelength-agnostic) and not need coherent detection or tunable optical filtering. However, a trade-off for these benefits is that interference between the OOK and OFDMA signals puts a limit on how far the signals can be transmitted as well as on the split ratio.

SUMMARY

A method for combining signals includes modulating data onto a first signal at a first frequency and wavelength; modulating data onto a second signal at a second wavelength using a modulation scheme that produces spectral components at the first frequency; filtering the second signal using an optical filter to suppress spectral components that would cause interference to the first signal; and combining the first signal and the second signal onto a transmission medium.

A system for combining signals includes a first transmitter configured to modulating data onto a first signal at a first frequency and wavelength; a second transmitter configured to modulate data onto a second signal at a second wavelength using a modulation scheme that produces spectral components at the first frequency; a filter configured to suppress the spectral components in the second signal that would cause interference to the first signal; and a combiner configured to combine the first signal and the second signal onto a transmission medium.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present principles provide optical filtering of legacy 10G on-off-keying (OOK) signals at an optical line terminal (OLT) to minimize the OOK signal's harmonic components in the frequency domain. This prevents the OOK signal from interfering with orthogonal frequency division multiple access (OFDMA) signals operating at other frequencies, allowing for superior transmission characteristics.

In an OOK signal, the signal takes the form of a square wave, with sharp edges in the time domain. However, the sharp edges in the time domain translate to an infinitely broad spectrum in the frequency domain, composed of a main lobe and gradually decaying side lobes. As a result, a time-domain square wave will create a broader frequency response than is desirable. If the OOK signal is the only signal being transmitted, than this causes no difficulties. However, if other signals are being transmitted at frequencies occupied by the OOK side lobes, then the wide frequency response of the OOK signal can cause interference with the other signals.

Figure 1:
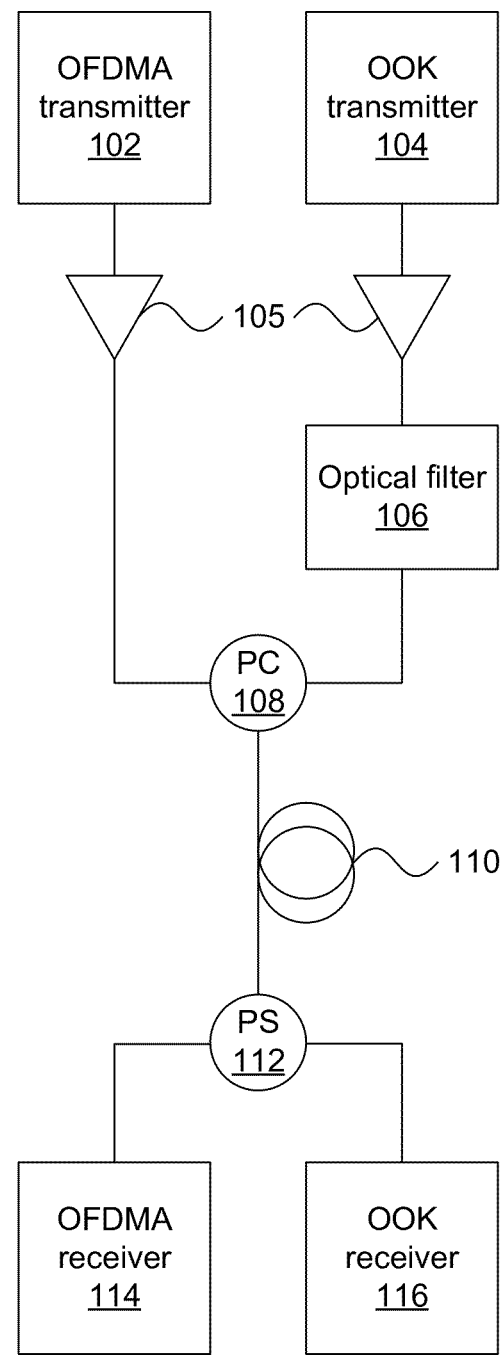
FIG. 1 is a block diagram showing an optical transmission system that combines orthogonal frequency division multiple access (OFDMA) signals with legacy on-off-keying signals in accordance with the present principles.

Referring now to FIG. 1, an embodiment of an optical system that combines OFDMA signals with legacy OOK signals is shown. A legacy system includes an OOK transmitter 104 that may be, for example, part of a legacy optical line terminal (OLT). The OOK transmitter shares a single medium or set of media 110 with an OFDMA transmitter 102. Although it is specifically contemplated that the medium 110 may be implemented as an optical fiber cable, it should be understood that the medium may also be implemented in air or free space or any other appropriate medium. The signals from both transmitters are amplified to a target level at optical amplifiers 105 and are combined at a passive optical combiner 108 before being sent along transmission line 110. The signals are then split at a passive optical splitter 112, which provides the signals to OFDMA receiver 114 and OOK receiver 116. The OFDMA signal is extracted in OFDMA receiver 114, and OOK signal is extracted in OOK receiver 116. To prevent spectral components from the OOK signal from interfering with OFDMA signals, a narrow-band optical filter configured for Nyquist filtering 106 is used before the OOK signal reaches the passive combiner 108. The narrow-band optical filter may be implemented using an optical waveshaper, without loss of generality, configured to have a passband that corresponds to a Nyquist shaped spectrum profile.

Figure 2:
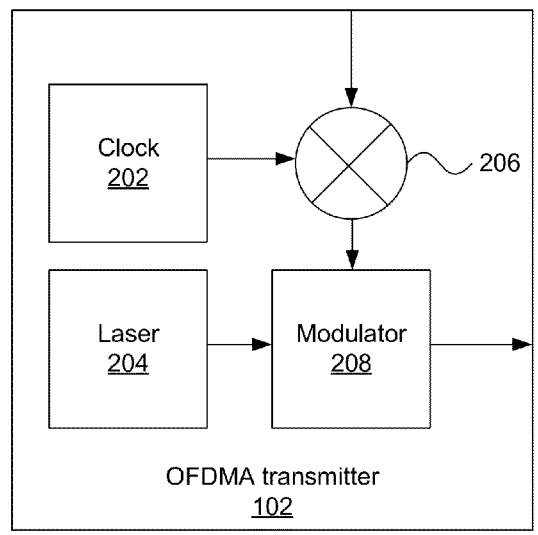
FIG. 2 is a block diagram of an OFDMA transmitter in accordance with the present principles.

Referring now to FIG. 2, additional detail on the OFDMA transmitter 102 is shown. One or more incoming OFDMA data signals from a data source 201 are mixed with a clock signal 202 at a mixer 206. A modulator 208 modulates the mixed signal(s) onto a laser beam generated by laser 204. It is specifically contemplated that the laser 204 may be a diode laser, but it should be understood that any appropriate form of laser may be used.

Figure 3:
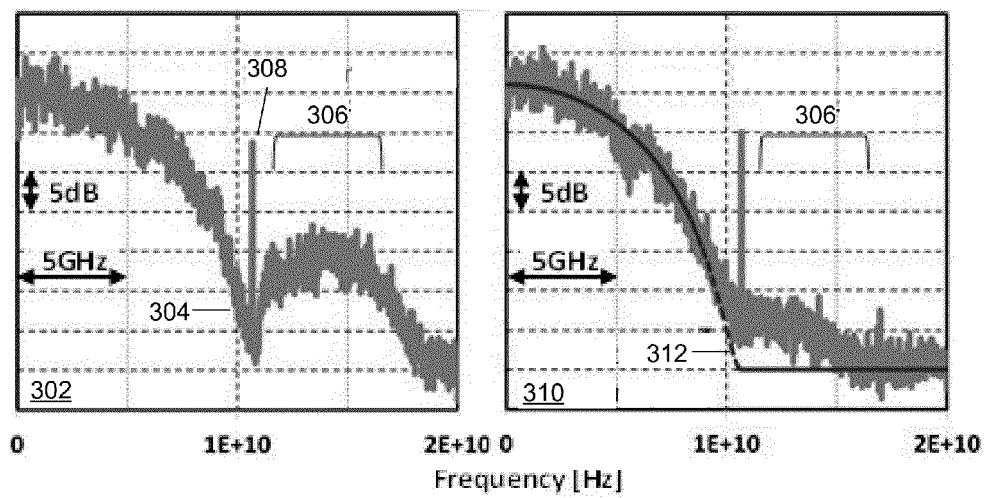
FIG. 3 is a comparison of OOK signal frequency outputs before and after filtering in accordance with the present principles.

Referring now to FIG. 3, a comparison between unfiltered and filtered signals in the optical domain is shown. Graph 302 plots the measured back-to-back OOK spectrum 304 that corresponds to the output of the OOK transmitter 104, showing that, while a significant portion of the optical spectrum is at the intended OOK main lobe frequencies (lower than the clock frequency 308), a significant side lobe component exists in the OFDMA spectrum region 306. It is this side lobe component that results in OOK/OFDMA interference, strongly degrading the OFDMA signals and restricting transmission distance and splitting ratio.

However, such components occurring at frequencies above the symbol rate are not needed and can be eliminated without introducing inter-symbol interference (ISI) by applying Nyquist-shape filtering. Graph 304 shows the optical spectrum of the Nyquist-filtered OOK signal at the output of the filter 106, which suppresses the unnecessary OOK component 306 shown in graph 302 by OLT-side optical Nyquist filtering, which, according to the Nyquist criterion, should introduce no ISI and thus should not degrade OOK signal performance. To confirm this, the optically Nyquist-filtered signal back-to-back OOK spectrum, corresponding to the output of the filter 106 is shown alongside a normalized raised cosine spectrum 312, known to be in the Nyquist shape family, in graph 310. A comparison between the graph 310 and the plotted curve 312 shows a strong match, with significant suppression of the OOK side lobe component in the OFDMA spectrum region 306.

Figure 4:
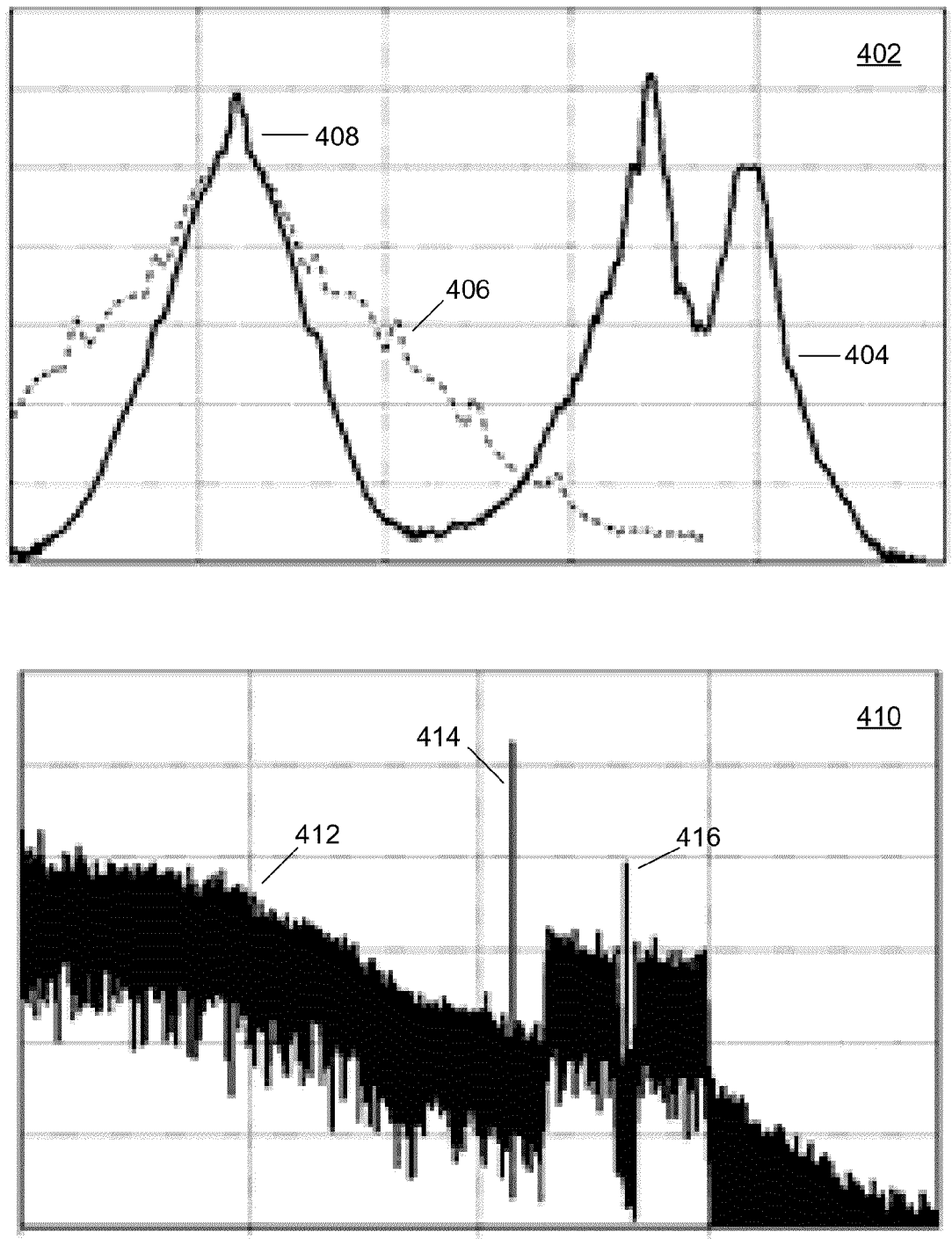
FIG. 4 is a comparison of combined OOK and OFDMA signals after OOK signal filtering in a wavelength domain and a frequency domain in accordance with the present principles.

Referring now to FIG. 4, the post-filtering optical spectrum of combined OOK and OFDMA signals is shown in the wavelength 402 and frequency domains 410. Graph 402 shows the combined response in the wavelength domain, with the filtered OOK signal peak 408 being shown in comparison to the unfiltered signal 406. As can be seen from graph 402, the filtering substantially decreases the component of the OOK signal that crosses into wavelengths covered by the OFDMA signal 404.

Graph 410 shows the same optical signal 412 in the frequency domain. A first peak 414 represents the clock signal 308 at, e.g., 10.7 GHz, while a second peak 416 shows the radio frequency (RF) carrier in the OFDMA signal(s) at 13.2 GHz. In the OFDMA receiver 114, the clear frequency separation allows the OOK signal components 412 and 414 to be filtered out using digital filtering. In the OOK receiver 116, OFDMA signal components may be automatically filtered by a low pass filter.

During testing of one exemplary embodiment, the bit error rates (BERs) of the OFDMA signal were above the forward error correction (FEC) limit of 1.0e-2 when optical Nyquist filtering was not applied on the OOK signal due to interference caused by the OOK signal side lobe. With OOK Nyquist filtering, however, OFDMA BERs are significantly reduced to under the FEC limit after transmission. Furthermore, the OOK signal exhibited no significant performance degradation induced by the optical filtering, with BER remaining under the FEC limit of 3.3e-3 after transmission. The optical Nyquist filtering of the OOK signal at the transmitter side helps OFDMA signal reception by suppressing the higher side lobe components of the OOK signal and, at the same time, due to its Nyquist shape, induces no degradation on OOK signal.

Figure 5:
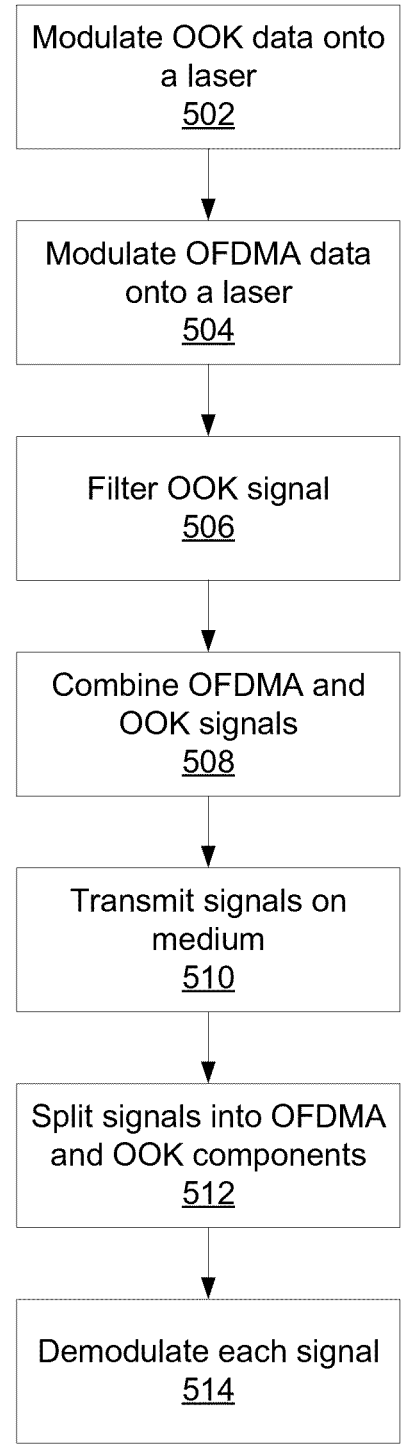
FIG. 5 is a block/flow diagram of a method for combining OFDMA signals with legacy OOK signals.

Referring now to FIG. 5, a method for communicating with combined OOK and OFDMA signals is shown. Block 502 modulates an OOK signal onto a first laser beam. The OOK laser operates at a first wavelength. Meanwhile, block 504 modulates an OFDMA signal onto a second laser beam, which has a different wavelength from the first laser beam but which, due to direct photodetection and no optical receiver side coherent detection or optical filtering, may result in electrical frequency domain OFDMA signal overlap (interference) with the side lobe OOK signal content of the first beam. Block 506 Filters the OOK signal of the first laser beam according to a Nyquist shape filter, removing or substantially damping the OOK side lobe spectral content from the first beam that would otherwise overlap with the OFDMA signal.

Block 508 combines the first laser beam and the second laser beam in a passive optical combiner before block 510 transmits the combined signals along a medium. The medium may be an optical fiber or any other appropriate medium. A splitter at the end of the medium splits the signals into OFDMA and OOK components in block 512. Block 513 receives the joint signals produced by the splitter in block 512 without optical filtering or coherent detection, and respective receivers demodulate each of the signals in block 514.

Embodiments of the present invention may be implemented in hardware, firmware or software, or a combination of the three. Preferably the embodiments are implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
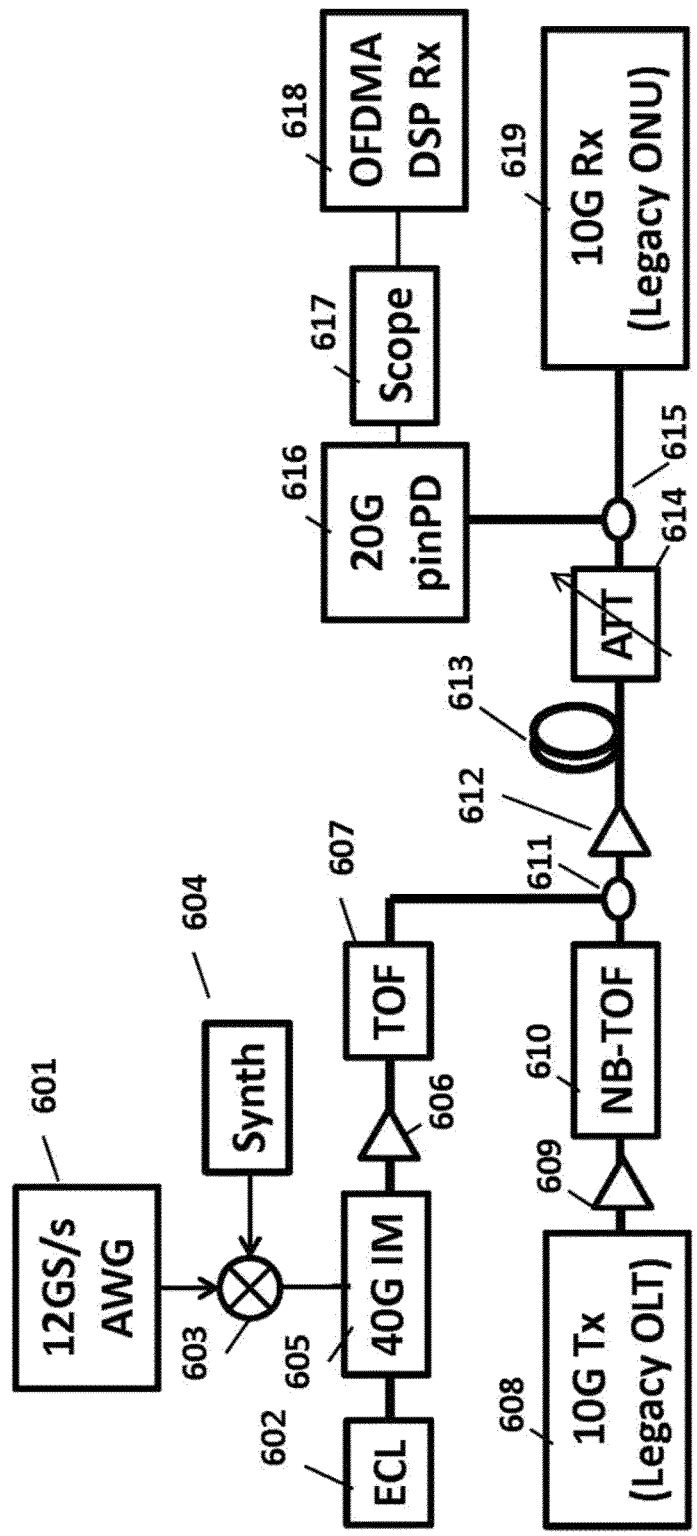
FIG. 6 is a block diagram of an experimental apparatus in accordance with the present principles.

Referring now to FIG. 6, the experimental setup used to confirm advantages of the present invention is shown. A commercially available 10.7 Gb/s non-return-to-zero (NRZ) OOK transmitter 608 featuring an exemplary output wavelength at 1550.92 nm, an amplifier 609, and a narrow-band tunable optical filter (NB-TOF) 610 with 8-GHz bandwidth were used to generate the optical Nyquist-filtered 10G OOK signal. A 12.75 Gb/s orthogonal frequency division multiplexed (OFDM) signal (3.1875 GHz, 16-quadrature-amplitude-modulation (QAM) symbols, fast-fourier-transform (FFT) size of 256, 20% forward error correction (FEC) and 7.5% training overhead) was generated offline, output continuously by a 12 GS/s arbitrary waveform generator (AWG) 601, and up-converted to $f_{RF}$=13.2 GHz at a mixer 603 using synthesizer 604. An external cavity laser (ECL) 602 having an exemplary wavelength at 1551.32 nm, a 40-GHz optical intensity modulator (IM) 605, an amplifier 606, and a tunable optical filter (TOF) 607 are used to generate the optical single sideband OFDMA signal.

The launch powers of the OFDMA and 10G OOK signals are set to 15.0 dBm and 13.0 dBm respectively. The signals are mixed at passive optical combiner 611 and amplified at amplifier 612. After 40 km standard single-mode fiber (SMF) 613, an optical attenuator (ATT) 614 is used to emulate total loss for 1:128 passive split conditions. After splitting the signal at a passive optical splitter 615, a 20 GHz pin photodiode (PD) 616 is used to convert optical OFDMA signal to the electrical domain, and a 40 GS/s real-time scope 617 is used to digitize the signal before it is decoded at OFDMA receiver 618. The OFDMA BER is computed off-line based on 0.25M measured bits. The 10G OOK BER is measured using the 7% overhead FEC decoder embedded in a commercial 10G receiver 619, based on pre-FEC error counts over the period of one minute.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for combining signals, comprising:
    modulating data onto a first signal at a first frequency and wavelength using an orthogonal frequency division multiple access modulation scheme;
    modulating data onto a second signal at a second wavelength using an on-off keying modulation scheme that produces spectral components at the first frequency;
    filtering the second signal using an optical filter to suppress spectral components that would cause interference to the first signal; and
    combining the first signal and the second signal onto a transmission medium after filtering the second signal.

2. The method of claim 1, wherein filtering comprises applying a Nyquist-shape optical filter to the second signal.

3. The method of claim 1, wherein said steps of modulating comprise modulating data onto respective laser beams.

4. The method of claim 1, further comprising jointly receiving the first and second signals without receiver-side optical filtering or coherent detection.

5. A system for combining signals, comprising:
    a first transmitter configured to modulating data onto a first signal at a first frequency and wavelength using an orthogonal frequency division multiple access modulation scheme;
    a second transmitter configured to modulate data onto a second signal at a second wavelength using an on-off-keying modulation scheme that produces spectral components at the first frequency;
    a filter configured to suppress the spectral components in the second signal that would cause interference to the first signal; and
    a combiner configured to combine the first signal and the second signal onto a transmission medium after filtering the second signal.

6. The system of claim 5, wherein the filter is an optical Nyquist-shape filter.

7. The system of claim 5, wherein said first and second transmitters are configured to modulate data onto respective laser beams.

8. The system of claim 5, further comprising a splitter configured to jointly receive the first and second signals without receiver-side optical filtering or coherent detection.

* * * * *